Oct. 10, 1961     J. D. SCHMUNK ET AL     3,003,216
APPARATUS FOR HANDLING AND SEVERING TILE
Filed May 11, 1959     8 Sheets—Sheet 1
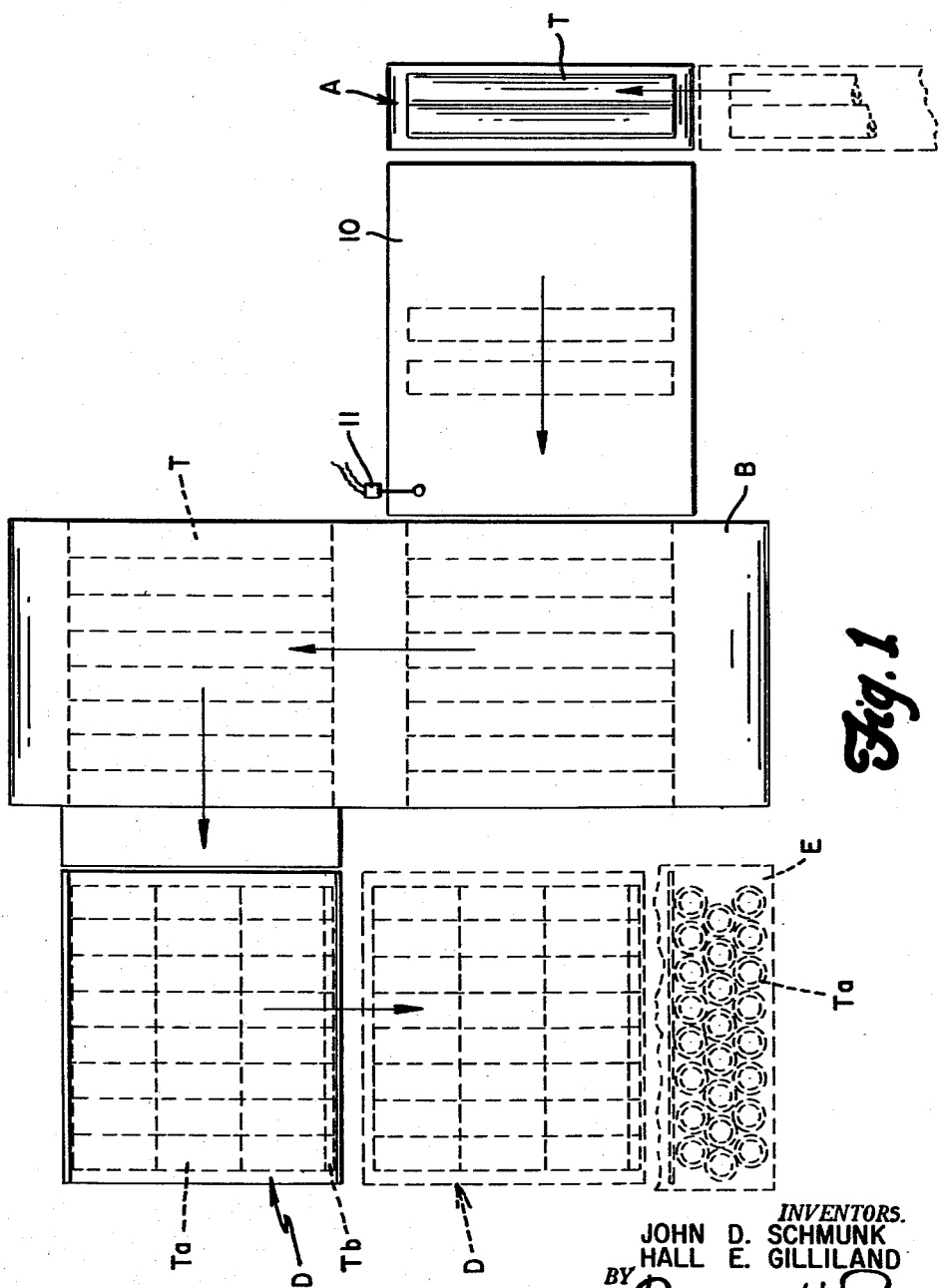
INVENTORS.
JOHN D. SCHMUNK
HALL E. GILLILAND
BY 
ATTORNEY

INVENTORS.
JOHN D. SCHMUNK
HALL E. GILLILAND

Oct. 10, 1961 J. D. SCHMUNK ET AL 3,003,216
APPARATUS FOR HANDLING AND SEVERING TILE
Filed May 11, 1959 8 Sheets-Sheet 3

INVENTORS.
JOHN D. SCHMUNK
HALL E. GILLILAND
BY
ATTORNEY

Oct. 10, 1961     J. D. SCHMUNK ET AL     3,003,216
APPARATUS FOR HANDLING AND SEVERING TILE
Filed May 11, 1959                      8 Sheets-Sheet 4
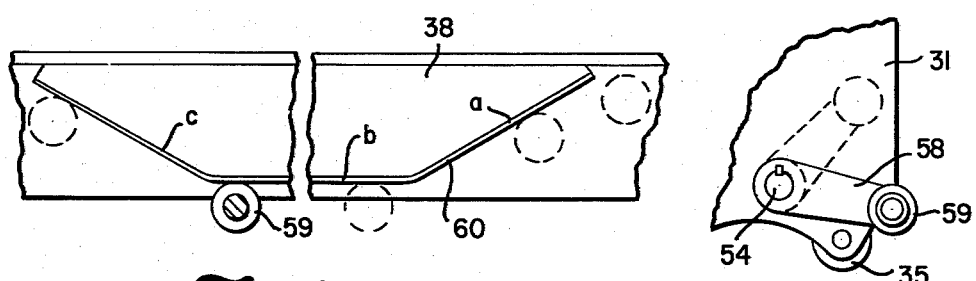
*Fig. 11*
*Fig. 12*
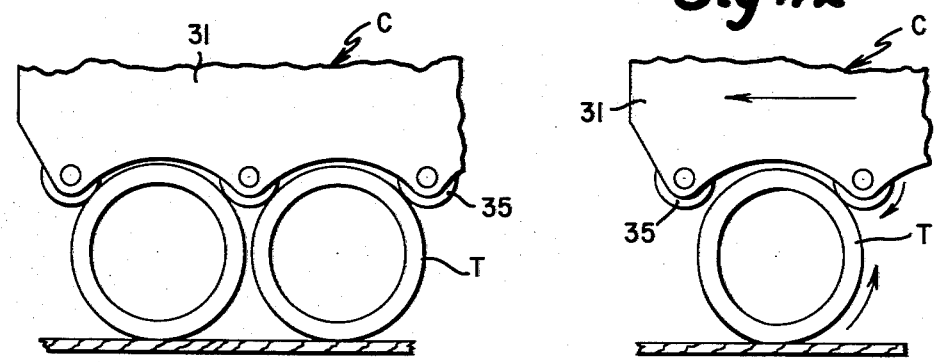
*Fig. 13*
*Fig. 14*
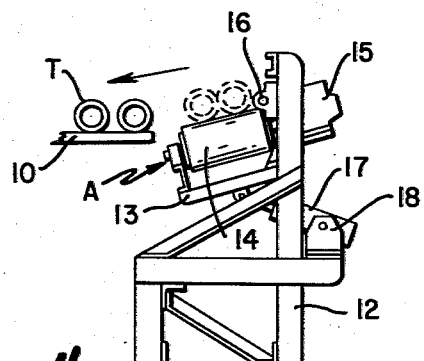
*Fig. 4*
INVENTORS.
JOHN D. SCHMUNK
HALL E. GILLILAND
BY 
ATTORNEY Oct. 10, 1961 J. D. SCHMUNK ET AL 3,003,216
APPARATUS FOR HANDLING AND SEVERING TILE
Filed May 11, 1959 8 Sheets-Sheet 5
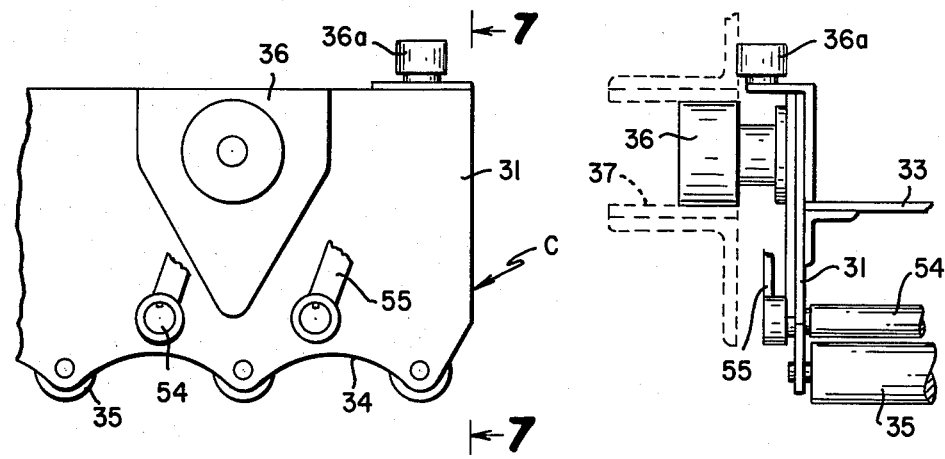
Fig. 6   Fig. 7
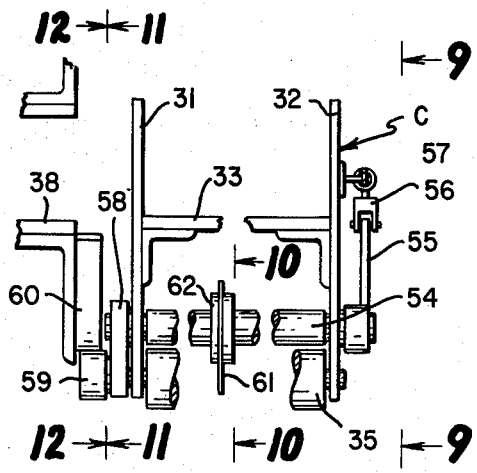 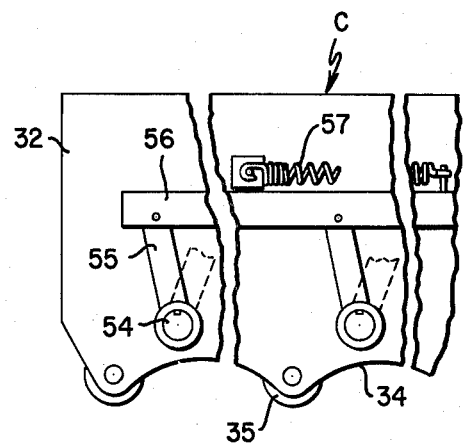
Fig. 8   Fig. 9
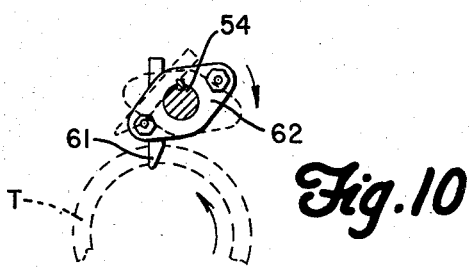
Fig. 10
INVENTORS.
JOHN D. SCHMUNK
HALL E. GILLILAND
BY Malcolm W. Fraser
ATTORNEY Oct. 10, 1961 J. D. SCHMUNK ET AL 3,003,216
APPARATUS FOR HANDLING AND SEVERING TILE
Filed May 11, 1959 8 Sheets-Sheet 8

INVENTORS.
JOHN D. SCHMUNK
HALL E. GILLILAND
BY Malcolm W. Fraser
ATTORNEY

United States Patent Office 3,003,216
Patented Oct. 10, 1961

3,003,216
APPARATUS FOR HANDLING AND SEVERING TILE

John D. Schmunk and Hail E. Gilliland, Findlay, Ohio, assignors to The Hancock Brick and Tile Company, Findlay, Ohio, a corporation of Ohio
Filed May 11, 1959, Ser. No. 812,393
2 Claims. (Cl. 25—2)

This invention relates to the manufacture of tile, particularly clay tile for drainage purposes or the like.

An object is to produce a new and improved machine for receiving lengths of clay tile from the extruder, such lengths being greater in length than that of the intended individual tile, and thereafter automatically severing the same into predetermined lengths, stacking them upon the kiln cars, and during the operation treating the tile in such manner as to insure true roundness and freedom from strains.

A still further object is to produce a novel machine for producing on a large quantity basis clay tile preparatory for the kiln by which tile is of uniform roundness and length, has end edges which are straight, true and free of burrs or other imperfections, and is of a structure free of strains.

Other objects and advantages of the invention will hereinafter appear and, by way of illustration but not of limitation, an embodiment of the invention is shown on the accompanying drawings in which FIGURE 1 is a diagrammatic plan view in the nature of a flow chart showing the path traveled by the tile from the time it is delivered to the machine until it is deposited in stacked formation on a kiln car;

FIGURE 4 is an end elevation of the dump conveyor showing it in tilted or dumping position;

FIGURE 6 is an enlarged fragmentary elevation of a portion of the cutter dolly;

FIGURE 7 is a fragmentary end view of the cutter dolly taken substantially on the line 7—7 of FIGURE 6;

FIGURE 8 is a broken away fragmentary view in elevation of a portion of a cutter dolly showing the mounting of one of the cutter knives and one of the rollers adjacent thereto;

FIGURE 9 is a fragmentary side elevation of the cutter dolly viewed from the side opposite to that of FIGURE 6 and taken on the line 9—9 of FIGURE 8;

FIGURE 10 is a sectional view substantially on the line 10—10 of FIGURE 8 showing the manner in which the knife blade is forced through the tile wall;

FIGURE 11 is a sectional view substantially on the line 11—11 of FIGURE 8 showing the cam track by which the cutter knives are actuated to and from cutting position as the cutter dolly advances;

FIGURE 12 is a fragmentary view substantially on the line 12—12 of FIGURE 8 showing the cam follower which traverses the cam track of FIGURE 11;

FIGURE 13 is a fragmentary side elevation of a portion of the cutter dolly showing how the rollers engage adjacent tiles and maintain them in spaced relation;

FIGURE 14 is a fragmentary end view of a portion of the cutter dolly showing how a roller engages a tile and imparts rotating movement to it as the dolly advances;

General description

The illustrated embodiment of the invention comprises a machine to which relatively long lengths of clay tile are delivered directly from a conventional extruder machine. For example the extruder will move a double column of tile at the rate of approximately ninety feet per minute, the endless tile being cut to forty-two inch lengths and these lengths are delivered in a double row to a dump conveyor A (FIGURE 1). The relatively long tile T is advanced on a dump conveyor A until a limit switch 19 is reached whereupon the conveyor stops and tilts laterally to discharge the tiles T upon a slightly inclined table 10 along which the tiles roll until they reach a second stage conveyor B. In the region of the table 10 is an electric counter 11 which, after eight tiles T have been delivered to the second stage conveyor B, energizes the latter, thereby to advance the group of eight tiles endwise to a position beneath a cutter dolly C, which lowers to cause rollers to engage the tiles in such manner as to separate them one from the other. When the cutter dolly is set in motion, cutter knives are actuated to extend into the several tiles in such manner that each tile T is severed into three tiles Ta with an expendable end ring Tb. Thus the knives remain relatively stationary and the severance is actually effected by the rolling motion of the tile caused by the advancing movement of the cutter dolly. The cutter dolly advances until it is disposed above an upender tray D whereupon the dolly raises and then retracts to its original position to repeat the operation on the next succeeding group of tiles T. The tiles Ta and the rings Tb on the upender tray are then clamped at opposite ends by members which hold the group in position. Then the upender tray is propelled forwardly and rocked to a vertical position directly above a kiln car E. The end clamping members are released in such a manner that the stacks of tile drop approximately one inch upon the deck of the kiln car. In order to make way for the next stack of tile, the kiln car is moved ahead to be in place for the next unit to be set in close relation. In this regard it should be understood that the cutter dolly alternately stops at an advanced position and at a position slightly rearwardly, this indexing enabling the stacks of tile when discharged upon the kiln car to crotch with the other stack. This enables a kiln car to carry a greater load as it passes through the kiln.

Dump conveyor

Figure 2:
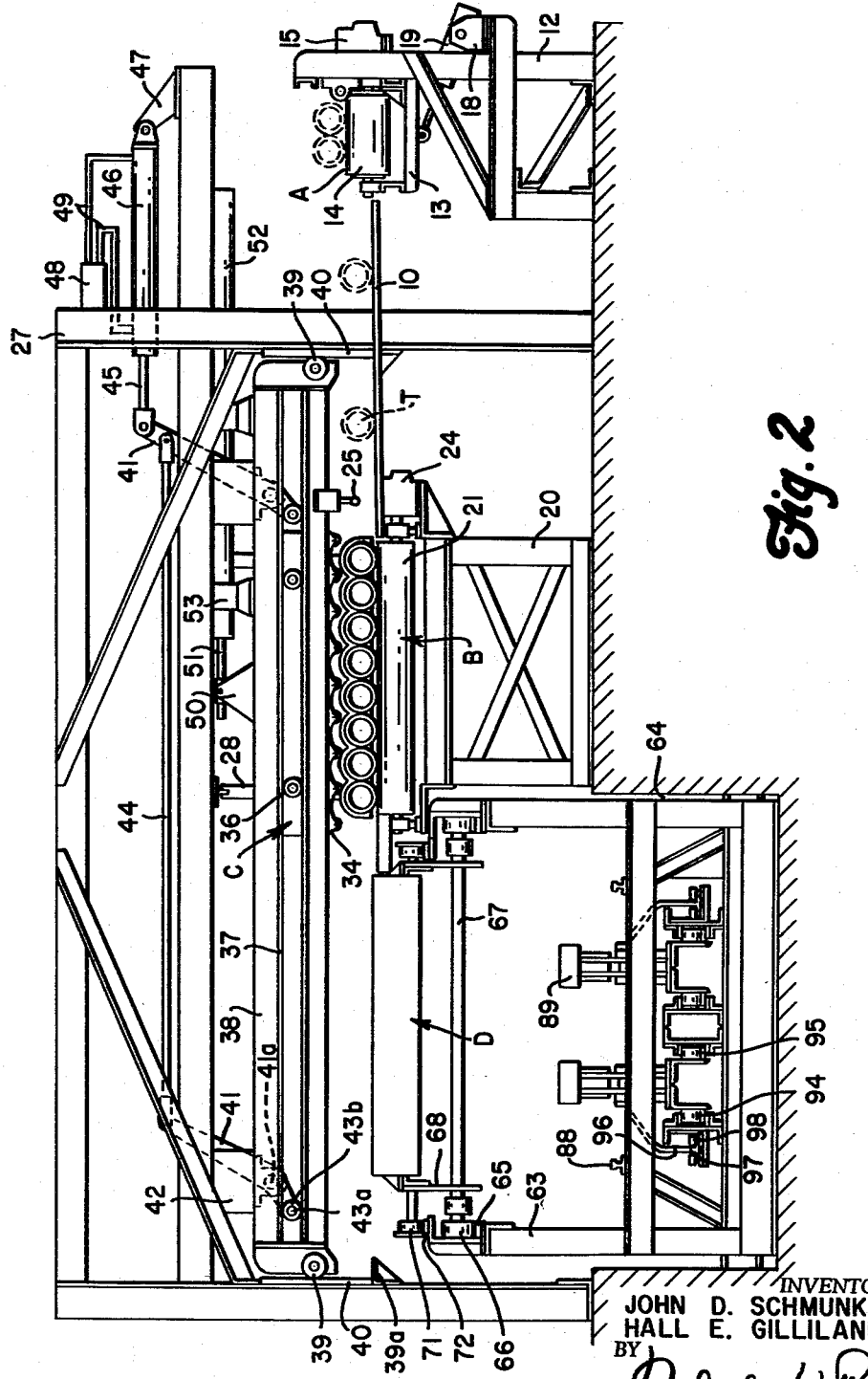
FIGURE 2 is a side elevation of the machine for handling and cutting tile.
Figure 3:
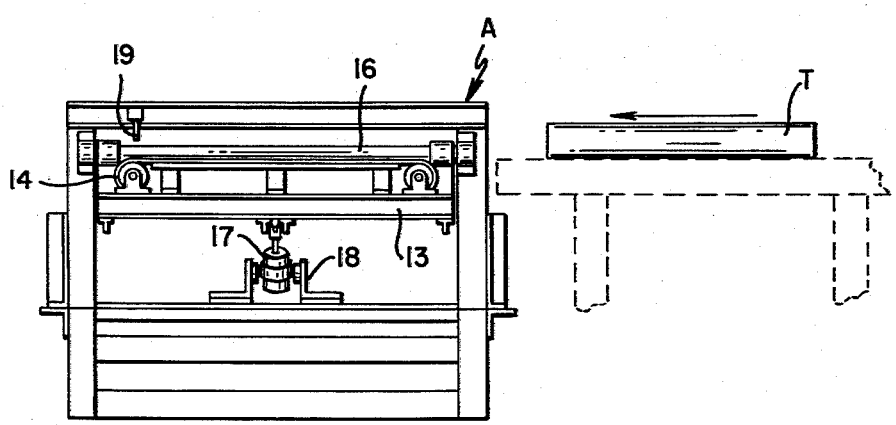
FIGURE 3 is a side elevation of the dump conveyor showing how the relatively long tiles are fed to this conveyor from the extruder machine.

Referring to FIGURES 2, 3 and 4 the dump conveyor comprises a standard 12 on which is mounted a conveyor having a frame 13 provided with an endless belt trained about end rollers 14, one of which is suitably driven by an hydraulic motor 15, there being a limit switch 19 at one end of the belt which upon engagement by the advancing tile T stops the conveyor. The conveyor frame 13 is mounted upon a shaft 16, which extends transverse of the standard 12. The conveyor frame 13 is maintained in level position by an air piston and cylinder assembly 17, which engages the underside of the frame 13 at one end and is mounted on brackets 18 carried by the standard 12. In operation air is exhausted from the piston cylinder assembly 17 in any suitable manner, such for example as by a solenoid air valve. Thereupon the conveyor 14 tilts to the position shown in FIGURE 4 allowing the tiles T to roll therefrom and upon the inclined table 10. After the tiles have rolled from the conveyor 14 it is returned to its level position by the piston and cylinder assembly 17 to which air under pressure is delivered. From the above it will be understood that a pair of tiles T is delivered to the dump conveyor which operates under the influence of the limit switch 19 to de-energize the motor 15 and energize a solenoid valve (not shown) for venting the air cylinder so that the weight of the conveyor causes it to tilt to discharge the tiles. The conveyor is restored to its normal level position by the readmission of air to the air cylinder in any suitable or well known manner and thereupon the motor is automatically energized.

The second stage conveyor

Figure 5:
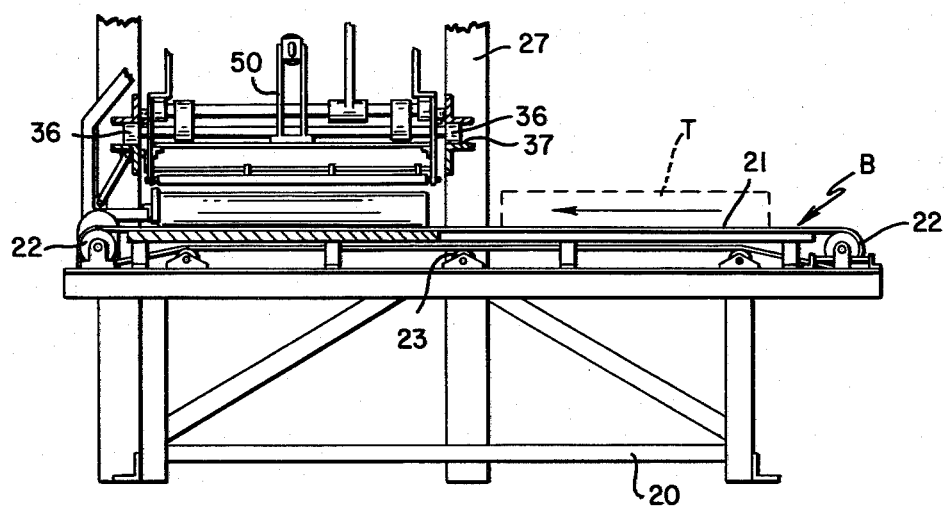
FIGURE 5 is a transverse fragmentary sectional view showing the second stage conveyor and the cutter dolly.

The tiles T from the dump conveyor A roll along the gently inclined table 10 upon an endless conveyor 21 which operates to move the tiles endwise. During such travel the tiles pass beneath an electric counter 25 which, when eight tiles have rolled upon the second stage conveyor 21, energizes through suitable means (not shown) a fluid motor 24 for driving the normally inoperative conveyor. The conveyor 21 is carried by an upright supporting frame or table 20 and consists of an endless belt of relatively non-skid material trained over end rolls 22, (FIGURE 5), the lower flight of the belt traveling over idler rolls 23. Thus after eight of the tiles T have been delivered to the second stage conveyor 21 the latter is set in motion and advances the tiles endwise until the ends thereof engage a stop plate 26.

The stop plate 26 is carried by an L-shaped arm 28 pivoted at 29 to an elevated supporting frame 27, a link 30 connecting the arm to a vertically movable frame 38 for causing its rocking motion to and from position of use. When the tiles are in position against the plate 26 they are directly beneath the cutter dolly C.

Cutter dolly

As above pointed out the relatively long tiles T are advanced endwise by second stage conveyor B to a position beneath the cutter dolly C, the tiles abutting against the stop plate 26 so that they are properly aligned at their ends whereupon the stop plate retracts. It will be understood that the conveyor B continues to operate a short period after the stop plate is engaged by the tile whereupon the conveyor stops. The cutter dolly comprises a pair of laterally spaced upright side plates 31 and 32 suitably connected by cross braces 33. The lower edge of each of the side plates is formed with scallops and connecting the lower ends of the respective scallops are free-turning, light weight rollers 35, which may be of metal with a smooth exterior surface. The rollers extend from side to side of the dolly substantially the entire length of the tiles T and are disposed to engage the various tiles throughout their length, a roller being disposed to engage a rear portion of each tile and the spacing being such that while at rest a roller engages the front and also the rear of each tile in the regions slightly below their top surface (see FIGURE 13).

The cutter dolly is mounted for to and fro translatory movements in a horizontal plane and as shown the side plates of the dolly are equipped with spaced guide rollers 36 arranged at the front and rear end portions thereof. The rollers 36 engage in horizontally elongate tracks 37 arranged on opposite sides of the cutter dolly and carried by an elongate guide frame 38. Adjacent the rollers 36 are vertical rollers 36a for engaging the inner walls of the frame 38. The guide frame 38 has up and down movement guided by end rollers 39 which traverse vertical pads 40 on the supporting frame 27, there being a stop shelf 39a at the lower end of each pad 40 for limiting the downward movement of the guide frame 38 and providing a rest therefor.

For raising and lowering the guide frame 38 a rock arm 41 is disposed at opposite ends of the frame and extends upwardly therefrom. The lower ends are secured to a cross shaft 41a to which are fixed downwardly inclined arms 43 to the lower ends of which is fixed a transverse rod 43a having rollers 43b. The rollers 43b engage in the horizontal guide track 37 so that by rocking the arms 41 in one direction or the other the guide frame 38 is raised or lowered. The rock arms 41 are connected for conjoint operation by a horizontal link 44 and connected to the right hand rock arm 41 is a piston rod 45 having a piston operating in a cylinder 46 pivoted at one end to a bracket 47 on the main supporting frame 27. On the supporting frame is a solenoid valve 48 which controls the movement of liquid under pressure to opposite ends of the cylinder 46 through tubes 49 and 49', thereby to actuate the piston and its piston rod 45 in one direction or the other.

Figures 19, 20, 21:
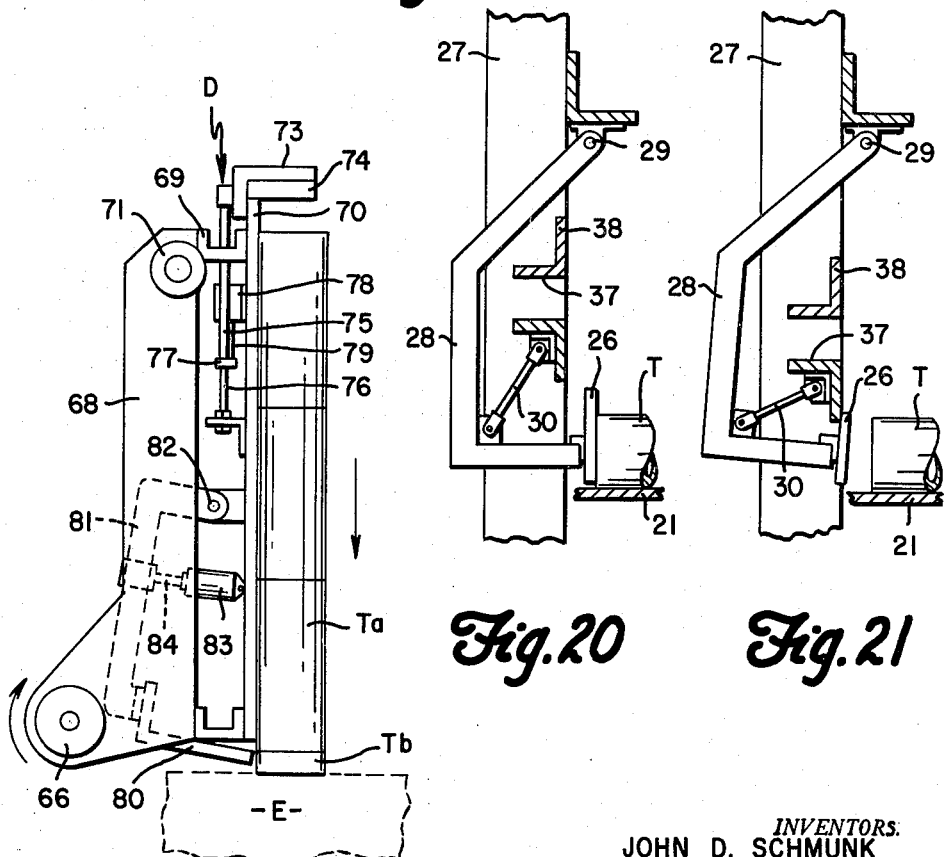
FIGURE 19 is a view of the upender tray in its vertical position with the clamping members released and the stacks of tile deposited upon a kiln car.
FIGURE 20 is a detail sectional view showing the stop plate at one end of the second stage conveyor against which the series of tile are advanced.
FIGURE 21 is a view similar to FIGURE 20 but showing the stop plate moved to inoperative position away from the series of tile.

It will be understood that normally the guide frame 38 is in its raised position so that the cutter dolly is disposed above the tiles T advanced to positions therebeneath by the second stage conveyor. However, when the tile engage the stop plate 26 a limit switch (not shown) is actuated which energizes, after a slight delay sufficient to align the tile ends, the solenoid valve 48 to admit liquid under pressure from a suitable source (not shown). This operates to lower the cutter dolly and move the rollers into engagement with the tile causing the latter to separate slightly from each other, a cam-like action resulting so that the tiles are shifted out of contact with each other. As shown on FIGURE 21, downward movement of the frame 38 imparts pressure against the link 30 to rock the stop plate 26 out of the way.

Mounted on the dolly frame are laterally spaced brackets 50 to which the forward end of a piston rod 51 is connected. The piston rod 51 has a piston operating in a cylinder 52 carried by longitudinally spaced brackets 53 on the guide frame 38. When the cutter dolly has reached its low position in contact with the tile, a limit switch (not shown) is tripped causing a solenoid valve (not shown) to admit liquid under pressure to the cylinder 52 for extending the piston rod 51 for moving the cutter dolly to the left of FIGURE 2. The cutter dolly moves in a gradual acceleration manner and then slows down at the end of its travel, this being controlled by flow control valves (not shown). As the cutter dolly advances the tiles T are cut to provide three separate tiles Ta of equal length and an expendable ring Tb.

The tile cutter mechanism is carried by the cutter dolly C and it comprises a plurality of parallel cross shafts 54, one being disposed between each pair of rollers 35 substantially as shown on FIGURE 6. The shafts 54 have bearing in the dolly side plates 31 and 32 and on the outer side of the side plate 32 each of the cross shafts 54 has fixed thereto a vertically disposed arm 55, the upper ends of which are connected by a common horizontally disposed bar 56. A coil spring 57 places the bar 56 and associated arm 55 under tension for purposes hereinafter described.

At the opposite end of the several cross shafts 54 and on the outside of dolly side plate 31 is a depending arm 58 which has a roller 59 at its outer end engageable with a cam track 60. The coil spring 57 urges the roller 59 into engagement with the cam track 60. Mounted on each of the cross shafts 54 are three spaced knife blades 61 carried by holders 62 fixed to the respective shaft 54 at predetermined positions, enabling three tiles of equal length and the expendable ring T$b$ to be cut.

Referring to FIGURE 11, as the cutter dolly advances, the cam follower or roller 59 for the several cross shafts engages the right hand portion $a$ of the cam track 60 which inclines downwardly, thereby simultaneously imparting rocking movement to the knives and causing them to enter the walls of the several tile T (FIGURE 10). Since the rollers 35 impart rolling motion to the tile during the advance of the cutter dolly the tile will all be severed after a complete revolution of the tile has been achieved. Tile cutting takes place as the cam follower 59 rolls over the horizontal portion $b$ of the cam track 60. After cutting has taken place the knives 61 are retracted when the follower 59 rides up the inclined portion $c$ of the cam track.

It is to be understood that the rolling of the tile prior to and under pressure of the free turning rollers 35 anneals or relieves strains which are inherent in compacted clay extruded under enormous pressure of the conventional auger-type tile machine. Rolling of the tile as above described causes the tile to be straight and true cylindrically when discharged from the machine, thereby obviating a difficulty heretofore encountered in the customary handling of tile.

By cutting the tile as above described a clean, smooth, lathe-like machined end surface is secured, making the tile ends true and free of burrs or other defects ordinarily resulting when conventional cutting wires are employed. This cutting also insures equal length of all cut tile and produces ends in true angular relation to the tile center axis. It will thus be clear that a group of eight tile are rolled forcefully by the cutter dolly as it advances and the knives penetrate and hold their position until the respective tile has made a complete turn. Thereafter the knives raise up above the tile.

Upender tray

Figure 15:
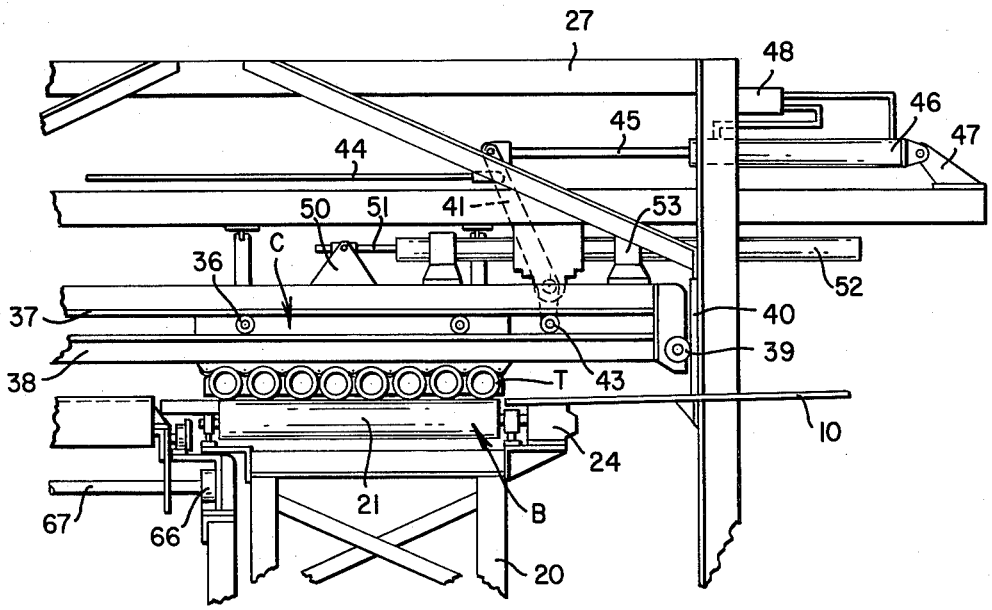
FIGURE 15 is a fragmentary side elevation of a portion of the machine showing the cutter dolly in its retracted position and lowered into an engagement with the tiles preparatory to its advancing movement during which tile cutting is effected.
Figure 16:
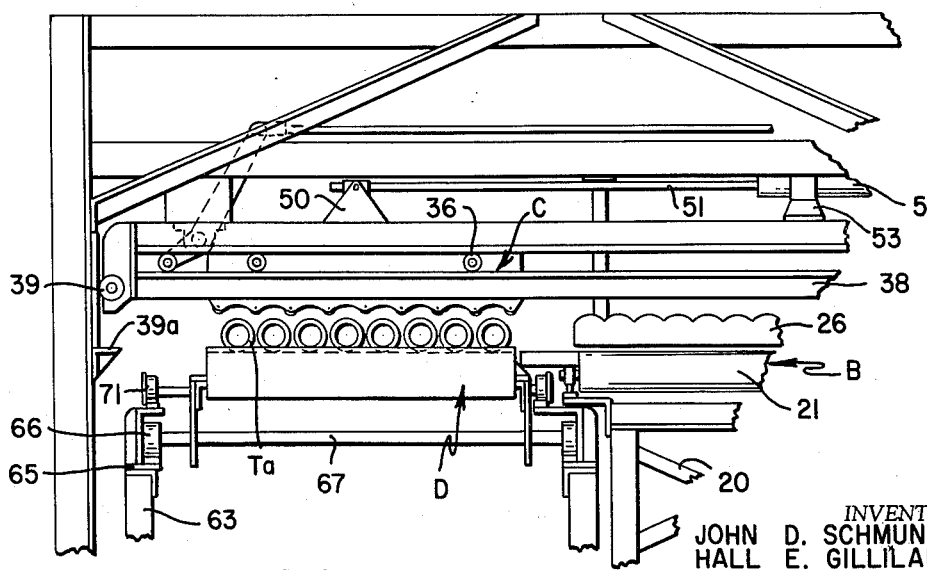
FIGURE 16 is a side elevation of a portion of the machine and showing the cutter dolly in its forwardly advanced position and elevated from the tile, the latter being disposed on the upender tray.

The cutter dolly rolls the severed tile sections T$a$ and rings T$b$ to an upender tray D and after it reaches the end of its travel by engagement with one of two limit switches (not shown), the guide frame 38 raises and thereby lifts the cutter dolly away from the tile. Then the cutter dolly returns to its right hand position shown on FIGURE 15. It will be understood that one of the two limit switches controls the length of stroke of the cutter dolly piston having the piston rod 51. One stroke delivers the group of tile to its maximum forward position and the next stroke delivers the succeeding group one-half tile diameter shorter and this operation goes on alternately. This achieves the "Crotch" setting on the kiln car E as will more fully appear hereinafter.

Figure 18:
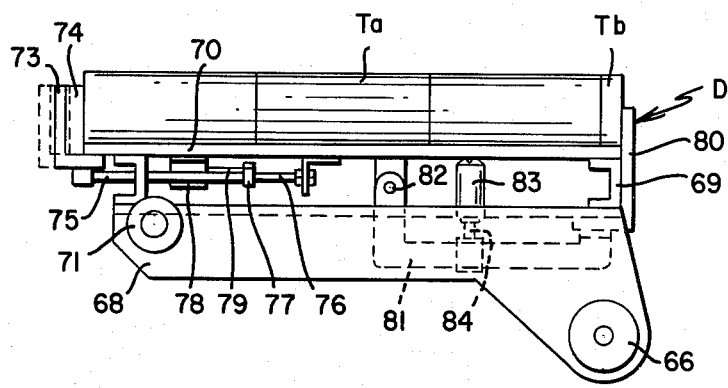
FIGURE 18 is an end elevation of the upender tray showing a row of severed tile clamped thereon.

The upender tray is mounted on an upright supporting frame 63, the bottom portion of which rises from a well 64 (FIGURE 2) through which the kiln cars E travel as will be hereinafter described. Mounted on the frame 63 is a pair of laterally spaced tracks 65 engaged by front rollers 66 of the upender tray, these rollers being mounted on the end portions of a transverse axle 67. The axle 67 is mounted in vertical frame plate 68 and, specifically, in downwardly and forwardly inclined extensions of these plates, as shown on FIGURE 18. Fixed to the upper ends of the plates 68 at opposite ends thereof are transverse U beams 69, on the upper end of which is secured a flat platform 70 which receives the severed tile advanced to it by the cutter dolly. At the rear end portion of the side plates 68 are mounted rear rollers 71 which roll along horizontal tracks 72 spaced above the tracks 65 and terminating short of the outer ends of the tracks 65.

Disposed at substantially right angles to the tray platform 70 at the left hand thereof (FIGURE 18) is an angle iron clamping bar 73 which has a foam rubber lining 74 for engaging one end of the series of tile delivered to the tray. Fixed respectively to the underside of the clamping bar 73 and to the undersurface of the platform 70 are telescoping guide members 75 and 76. A cross bar 77 is fixed to the guide member 75 and connected thereto is a piston 79 operating in an air cylinder 78. By introducing air into one end or the other of the cylinder 78, the clamping bar 73 is moved to and from tile-clamping position.

At the right hand end (FIGURE 18) of the upender tray is a clamping plate 80 which cooperates with the clamping bar 73 to clamp the series of stacks of tile T$a$ and their rings T$b$ therebetween, the plate 80 bearing against the rings T$b$. A bent arm 81 is disposed beneath the tray platform 70 and is fixed at one end to the clamping plate 80 and the opposite end is pivoted at 82 to a bracket depending from the underside of the platform 70. An air cylinder is connected to the underside of the platform and has a piston 84 operating against the bent arm 81 for moving the clamping plate 80 to and from tile clamping position.

After the cutter dolly has advanced its group of severed tile T$a$ and end rings T$b$ to the upender platform 70, it moves out of the way and then in response to a suitable limit switch (not shown) the clamping bar 73 and clamping plate 80 move toward each other in order securely to clamp the tile stacks in position. Thereupon a hydraulic cylinder 85 on the track 72 is placed in operation to advance its piston rod 86, which is connected to the left hand end (FIGURE 17) of the upender tray and advances the upender tray until the rollers 66 engage end stops 87. Continued movement of the piston rod 86 rocks the upender tray in a clockwise manner about the rollers 66 to its upright position directly above and slightly spaced from the platform of a kiln car E. The stroke of the piston rod 86 is so controlled that it starts gradually, moves quickly to the end stops 87 and then rocks the upender tray to a vertical position without damage to the stacks of tile. When the upender tray is in vertical position, a limit switch (not shown) activates a solenoid air valve which causes the air cylinders 83 quickly to force the clamping plate 80 out from beneath the stacks of tile. Thereafter the kiln car is moved ahead to be in place for the next group of tile.

Kiln car operation

Kiln cars E travel along a track 88 which is so located in the well 64 that the cars pass through the machine, are loaded as they are indexed, and continue on in a continuous line. Individual cars are advanced by pusher arms 89. As shown in FIGURE 2 there are two of these pusher arms but only one operates to propel a car, the other pusher arm being in retracted position for engaging the next succeeding car for advancing it at the proper time. Thus the two pusher arms are operated by similar but separate propelling devices. Only one of these devices will be described but it is to be understood that the other is similar in structure and in operation. Each pusher arm 89 is pivoted intermediate its ends to a dolly bracket 90 carried by a dolly. At the opposite end of the pusher arm is a roller 91 which rides along a horizontal track 92 during its operative movement. On the upper edge of the pusher arm there is a cam surface 93 engageable with the underside of a kiln car E during retracting movement so that the arm will rock out of the way, the opposite end being counterweighted to cause it to assume an upright operative position after having passed beneath a kiln car. The dolly carries at its lower end a pair of rollers 94 which travel in horizontal tracks 95.

Figure 17:
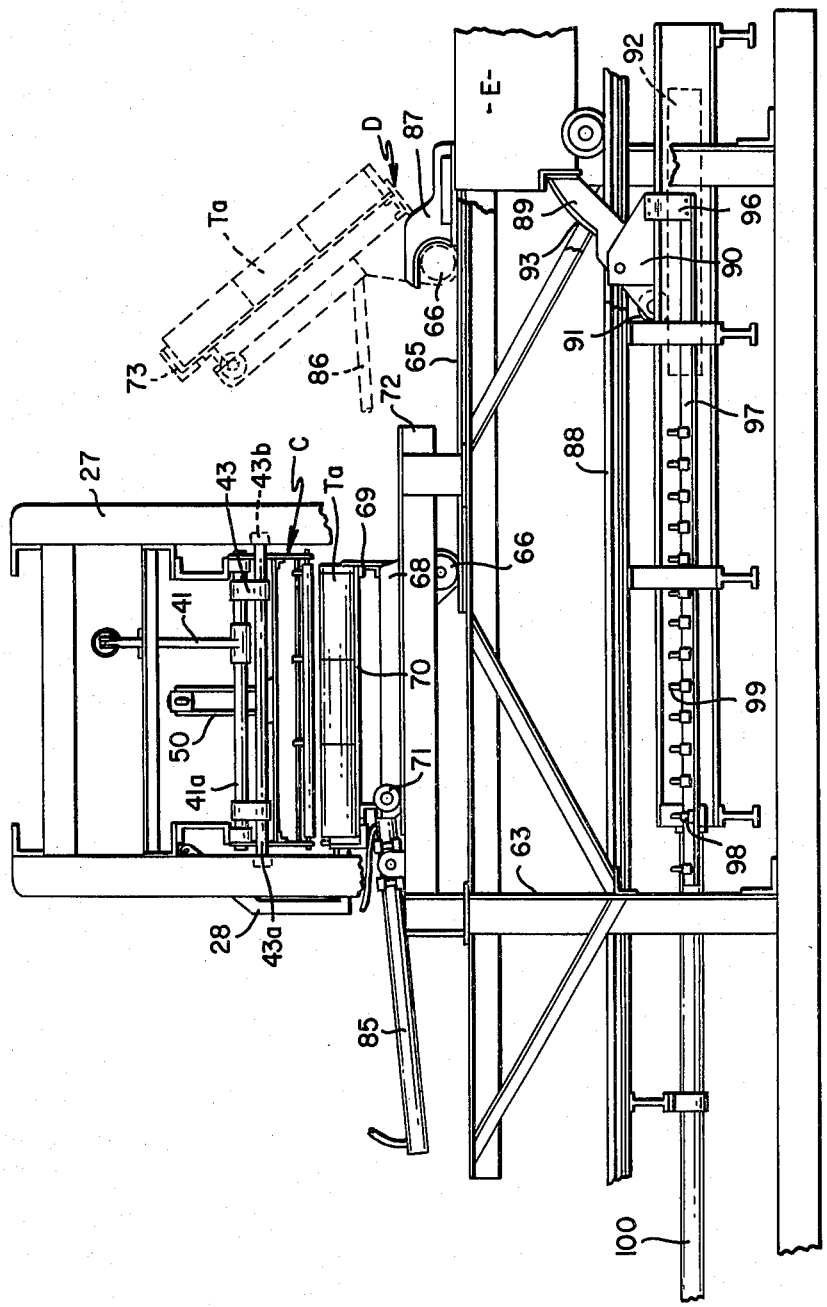
FIGURE 17 is an end elevation of the machine showing a group of tile upon the upender tray with the cutter dolly having raised and retracted, a broken line in position showing the upender tray being rocked to its vertical position preparatory to discharging the stacks of severed tile upon a kiln car.

Fixed to the dolly bracket 90 is an outwardly and downwardly extending hanger plate 96 which is fixed to a T bar slide 97 which is horizontally disposed and, as shown in FIGURE 2, engages beneath a pair of spaced rollers 98 which, as shown in FIGURE 17, are arranged to guide and support the opposite end portion of the T bar 97. Carried by the T bar 97 is a series of spaced limit switch trip fingers 99. As the dolly is advanced the trip fingers 99 successively engage a limit switch (not shown) which operates to impart a short advancing or indexing movement to the kiln car. Such limit switch is suitably connected for controlling the operation of an hydraulic indexing cylinder and piston assembly 100, thereby successively to introduce liquid under pressure to the cylinder for advancing its piston step by step until the kiln car is fully loaded. The final finger 99 operates to trip a suitable switch for introducing liquid under pressure to the opposite end of the cylinder, thereby to retract the dolly to engage a succeeding car for advancing it. Thus when one of the pusher arms 89 is retracting, the other arm is at work pushing cars so that there is no time lag between cars. After the cars are loaded they are then advanced to a kiln, such for example, as a tunnel kiln for firing the tile.

Numerous changes in details of construction, arrangement, and operation may be effected without departing from the spirit of the invention, especially as defined in the appended claims. Reference has herein been made to various limit switches, solenoid valves and the like without illustration thereof because details of same form no part of the present invention and such structure as well as the operation of same are well known to those skilled in this art.

What we claim is:

1. In a machine of the class described, a dump conveyor for receiving relatively long semi-plastic clay tile, means to incline the conveyor for allowing the tile to roll therefrom, an inclined table adjacent the conveyor and over which the tile roll, a second stage conveyor for receiving tile from the table, motivating means for said second stage conveyor, means operative after a predetermined number of long tile have been delivered to said second conveyor for energizing same, a cutter dolly beneath which tile are delivered by said second conveyor in endwise relation, a series of horizontal rollers on said dolly for engaging fore and aft portions of the tile respectively for separating the tile from each other and imparting rolling motion thereto, a series of knives carried by the dolly and disposed intermediate adjacent tile for severing the long tile into predetermined lengths, means for imparting horizontal advancing and retracting movements to said dolly for moving the tile sidewise, means for lowering the dolly initially into engagement with the tile at the start of advancing movement, means for raising the dolly away from the tile after the dolly has completed its advancing movement, means for causing the knives to penetrate the walls of the respective tile at the outset of the advancing movement of the dolly so that severence is effected as the tile roll, means to retract the knives when severence is effected, an upender tray arranged beneath the dolly and at the end of its advancing movement for receiving the severed tile from the dolly, means to clamp together the stacks of severed tile on the upender tray, means to advance and retract the tray for enabling the tile to be moved endwise, stop means for limiting the advancing movement of the upender tray and enable the advancing means by further movement thereof to rock the tray to vertical position, means operable when the upender tray is in vertical position for abruptly retracting the clamping means for releasing the stacks of tile, means for disposing a kiln car in position to receive the stacks of tile from the upender tray, means to impart step by step motion to the kiln car for successively receiving stacks of tile, and separate means to advance a succeeding car when the first one is filled.

2. In a machine of the class described, a conveyor for advancing a group of relatively long lengths of semi-plastic tile in an endwise direction, means operative after a predetermined number of long tile have been delivered to said conveyor for energizing same, a cutter dolly beneath which tile are delivered by said conveyor in endwise relation, a series of horizontal rollers on said dolly for engaging fore and aft portions of the tile respectively for separating the tile from each other and imparting rolling motion thereto, a series of knives carried by the dolly and disposed intermediate adjacent tile for severing the long tile into predetermined lengths, means for imparting horizontal advancing and retracting movements to said dolly for moving the tile sidewise, means for lowering the dolly initially into engagement with the tile at the start of advancing movement, means for raising the dolly away from the tile after the dolly has completed its advancing movement, means for causing the knives to penetrate the walls of the respective tile at the outset of the advancing movement of the dolly so that severence is effected as the tile roll, means to retract the knives when severence is effected, an upender tray arranged beneath the dolly and at the end of its advancing movement for receiving the severed tile from the dolly, means to clamp together the stacks of severed tile on the upender tray, means to advance and retract the tray for enabling the tile to be moved endwise, stop means for limiting the advancing movement of the upender tray and enable the advancing means by further movement thereof to rock the tray to vertical position, and means operable when the upender tray is in vertical position for abruptly retracting the clamping means for releasing the stacks of tile.

References Cited in the file of this patent

UNITED STATES PATENTS

| | | |
|---|---|---|
| 549,707 | Denney | Nov. 12, 1895 |
| 886,298 | Johns | Apr. 28, 1908 |
| 1,120,134 | Connor | Dec. 8, 1914 |
| 1,614,400 | Selman et al. | Jan. 11, 1927 |
| 1,934,660 | Fairchild | Nov. 7, 1933 |
| 2,321,735 | Clifford | June 15, 1943 |
| 2,399,360 | Lacey | Apr. 30, 1946 |
| 2,682,696 | Milliken | July 6, 1954 |
| 2,795,027 | Rossier | June 11, 1957 |
| 2,795,028 | Rossier | June 11, 1957 |